United States Patent [19]

Yamashita

[11] Patent Number: 5,517,552
[45] Date of Patent: May 14, 1996

[54] FACSIMILE APPARATUS WITH CORDLESS PHONE, A RING SIGNAL DETECTION, AN INTERFACE PORTION, A FACSIMILE COMMUNICATION START SIGNAL DETECTION AND A FIRST AND SECOND MODES OF OPERATION

[75] Inventor: Tetsuo Yamashita, Fukuoka, Japan

[73] Assignee: Matsushita Electric Industrial Co., Ltd., Osaka, Japan

[21] Appl. No.: 417,253

[22] Filed: Apr. 5, 1995

[51] Int. Cl.$^6$ ............................................. H04Q 7/32
[52] U.S. Cl. ........................................ 379/58; 379/100
[58] Field of Search .................................. 358/404, 405, 358/431, 442, 444, 468; 370/18, 50, 95.3; 375/205; 379/56, 58, 61, 67, 88, 89, 90, 93, 97, 98, 100; 455/33.1, 56.1, 66, 74, 89

[56] References Cited

U.S. PATENT DOCUMENTS

| | | | |
|---|---|---|---|
| 5,263,078 | 11/1993 | Takahashi et al. | 379/58 |
| 5,282,238 | 1/1994 | Berland | 379/58 |
| 5,319,634 | 6/1994 | Bartholomew et al. | 370/18 |

OTHER PUBLICATIONS

Bell South Cellular Corporation, "Bell South Cellular/IBM Simon", May 17, 1994.

Prnewswire, "Simple Technology Inc.", Apr. 12, 1995.

Business Wire, "Bell Mobility", Jul. 13, 1995.

*Primary Examiner*—Curtis Kuntz
*Assistant Examiner*—William Cumming
*Attorney, Agent, or Firm*—Rossi & Associates

[57] ABSTRACT

In a facsimile apparatus comprising: a facsimile portion, having a CPU, for effecting facsimile receiving and transmitting operations; and a cordless phone portion for communicating with a cordless phone unit for providing a communication with a cordless phone unit for providing a communication with a telephone line or an extension line communication through a radio wave, the CPU has a sleep mode or a hold mode and at least at starting of the communication by the cordless phone portion, the CPU is made in the sleep mode or the hold mode to reduce a noise received by the cordless phone portion together with the radio wave. Therefore, when the electrostatic intensity is measured to detect a free channel, the affection of the noise due to the operation can be reduced. If the CPU is in the sleep mode or the hold mode during the cordless communication, the noise interfering the cordless communication is also reduced. In the sleep or hold mode, data concerning to facsimile communication is maintained, so that it is possible to restart the facsimile communication on the basis of the stored data.

20 Claims, 8 Drawing Sheets

FACSIMILE APPARATUS WITH CORDLESS PHONE, A RING SIGNAL DETECTION, AN INTERFACE PORTION, A FACSIMILE COMMUNICATION START SIGNAL DETECTION AND A FIRST AND SECOND MODES OF OPERATION

BACKGROUND OF THE INVENTION

1. Field of the Invention

This invention relates to a facsimile apparatus with a cordless phone.

2. Description of the Prior Art

A facsimile apparatus having a facsimile portion and a radio frequency portion for communicating with a cordless phone accompanied with the facsimile apparatus is known. The carrier frequency used for the communication between the radio frequency portion and the cordless phone is 400 MHz in Japan and 46 MHz to 49 MHz in U.S.A. In the facsimile apparatus having the radio frequency portion having the frequency from 46 MHz to 49 MHz, when a facsimile signal is received while a communication between the radio frequency portion and the cordless phone is performed, the communication is interfered by noise due to the noise developed by a modem in the facsimile portion. More specifically, a central processing unit performing the modem processing generates the noise.

A prior art facsimile apparatus, disclosed in Japanese patent application provisional publication No. 4-167750, comprising a facsimile portion and a cordless telephone portion for communicating with a cordless phone. While the cordless phone performs an extension line communication with the facsimile apparatus, the facsimile apparatus does not receive a facsimile transmission to prevent the development of noise interfering the extension line communication and receives it after the completion of the extension line communication.

SUMMARY OF THE INVENTION

The aim of the present invention is to provide an improved facsimile apparatus with a cordless phone.

In a facsimile apparatus comprising: a facsimile portion, having a CPU, for effecting facsimile receiving and transmitting operations; and a cordless phone portion for communicating with a cordless phone unit for providing a communication with a telephone line or an extension line communication through a radio wave signal, the CPU has a sleep mode or a hold mode and at least at starting of the communication by the cordless phone portion, the CPU is made in the sleep mode or the hold mode to reduce an interference noise received by the cordless phone portion together with the radio wave signal. Therefore, when the electrostatic intensity is measured to detect a free channel by the cordless phone portion, the interference noise generated by the CPU received by the cordless phone portion and the cordless phone can be reduced.

If the CPU is in the sleep mode or the hold mode during the cordless communication, the noise interfering the cordless phone communication is also reduced. In the sleep or hold mode, data concerning to facsimile communication is maintained, so that it is possible to restart the facsimile communication on the basis of the stored data. In the sleep mode, a frequency of a clock signal supplied to the CPU is extremely reduced compared with the normal operation and there are first and second types of hold mode. In the first type of hold mode, the frequency of the clock signal is the same as the normal operation but the processing in the CPU is essentially stopped. In the second type of hold mode, the generation of clock signal used for processings of the CPU 13 is stopped.

According to the present invention there is provided a first facsimile apparatus comprising: a ring signal detection portion for detecting a ring signal from a telephone line; an interface portion for coupling the interface portion to the telephone line; a facsimile communication start signal detection portion responsive to the interface portion for detecting a facsimile communication start signal; a facsimile portion, having a central processing unit having first and second modes, for effecting facsimile receiving and transmitting operations through the interface portion; a cordless phone portion, having a speech circuit, for communicating with a cordless phone unit, forming a first communication passage between the cordless phone unit and the telephone line through the interface portion through a radio wave signal in a non-extension line mode and forming a second communication passage between the cordless phone unit and the speech circuit through the radio wave signal in an extension line mode, the central processing unit executing the receiving and transmitting operations and generating an interference noise received by the cordless phone portion in the first mode and essentially stopping of the receiving and transmitting operations and reducing the generation of the interference noise received by the cordless phone portion in the second mode; and a control portion for making the central processing unit in the first mode and operating the facsimile portion when said facsimile portion is to be operated, for making the central processing unit in the second mode when the facsimile portion is not operated, and for operating the cordless phone portion in response to the detected ring signal, a first OFF-HOOK signal supplied thereto, or a second OFF-HOOK signal sent from the cordless phone unit to the cordless phone portion.

In the first facsimile apparatus mentioned above, the facsimile portion is to be operated when the ring signal and the facsimile start signal is detected or when a facsimile operation command from the user is present.

In the first facsimile apparatus mentioned above, the control portion further comprises a communication completion detection means for detecting a completion the communication between the cordless phone portion and the cordless phone unit, the control portion keeps the central processing unit in the second mode when the ring signal and the facsimile start signal are detected while the control portion operates the cordless phone portion, and the control portion operates the facsimile portion to effect the facsimile receiving operation after the communication completion detection means detects the completion of the communication.

In the first facsimile apparatus mentioned above, the control portion makes the central processing unit in the first mode and operates the facsimile portion to effect the facsimile transmission operation in response to a facsimile transmission command while the cordless phone portion is in the extension line mode.

In the first facsimile apparatus mentioned above. the control portion keeps the central processing unit in the second mode in response to a first facsimile transmission command while the cordless phone portion is in the extension line mode and the control portion makes the central processing unit in the first mode and operates the facsimile portion to effecting the facsimile transmission operation in response to the first facsimile transmission command and a second facsimile transmission command while the cordless phone portion is in the extension line mode.

In the first facsimile apparatus mentioned above, the central processing unit has first and second processing speeds in the first and second modes respectively and the second processing speed is extremely lower than the first processing speed.

In the first facsimile apparatus mentioned above, the second mode is a sleep mode.

In the first facsimile apparatus mentioned above, the second processing speed is essentially zero and the second mode is a hold mode.

According to this invention, there is also provided a second facsimile apparatus comprising: a ring signal detection portion for detecting a ring signal from a telephone line; an interface portion for coupling the interface portion to the telephone line; a facsimile communication start signal detection portion responsive to the interface portion for detecting a facsimile communication start signal; a facsimile portion, having a central processing unit having first and second modes, for effecting facsimile receiving and transmitting operations through the interface portion; a cordless phone portion for communicating with a cordless phone unit and forming a communication passage between the cordless phone unit and the telephone line through the interface portion through a radio wave signal, the central processing unit executing the receiving and transmitting operations and generating an interference noise received by the cordless phone portion in the first mode and essentially stopping of the facsimile receiving and transmitting operations and reducing the generation of the interference noise received by the cordless phone portion in the second mode; and a control portion for making the central processing unit in the first mode and operating the facsimile portion when the facsimile portion is to be operated, for making the central processing unit in the second mode when the facsimile portion is not operated, and for operating the cordless phone portion in response to the detected ring signal, or a OFF-HOOK signal sent from the cordless unit to the cordless phone portion.

In the second facsimile apparatus, the facsimile portion is to be operated when the ring signal and the facsimile start signal is detected or a facsimile operation command from the user is present.

BRIEF DESCRIPTION OF THE DRAWINGS

The objects and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
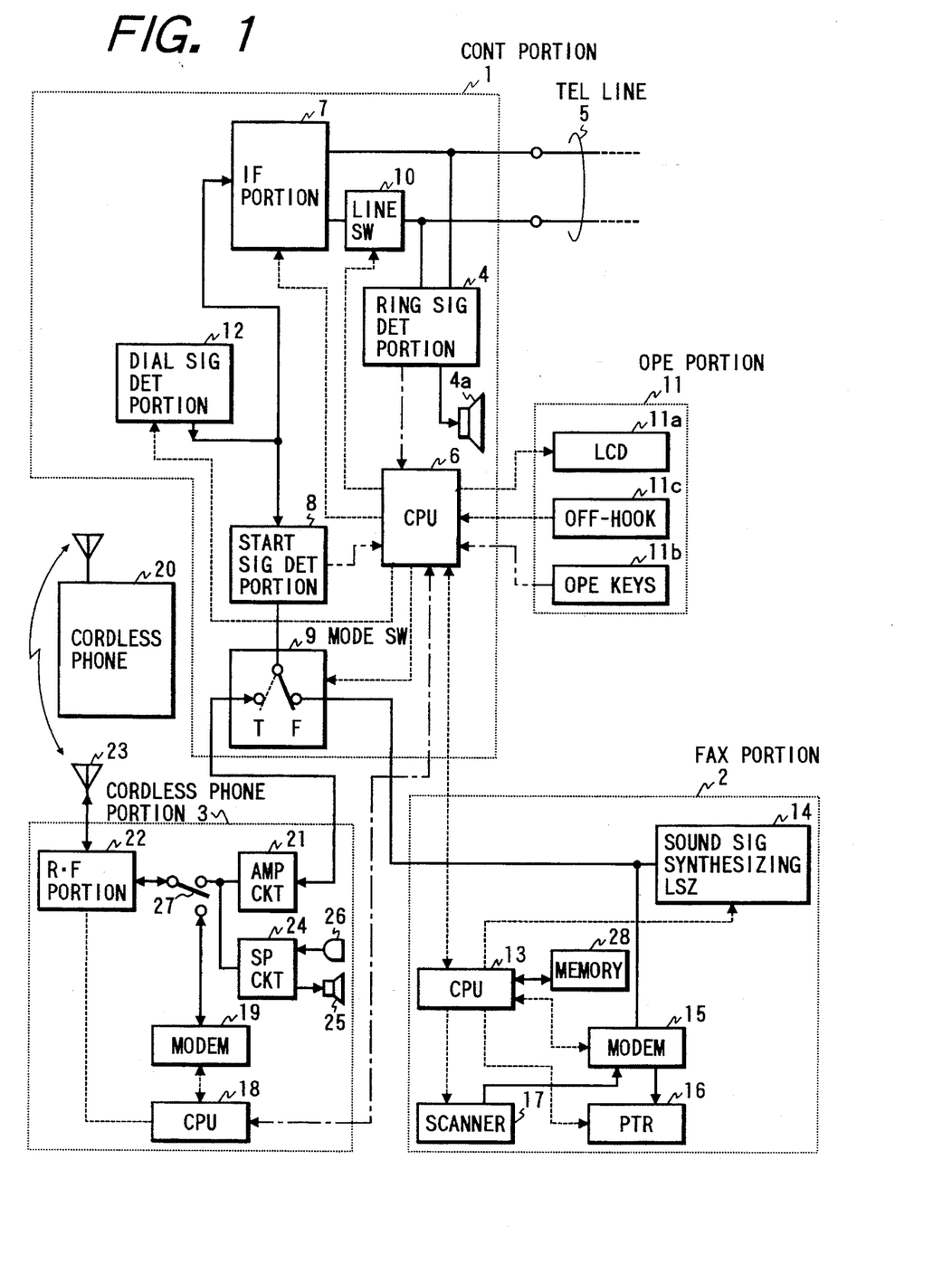
FIG. 1 is a block diagram of an embodiment of facsimile apparatus.

FIG. 1 is a block diagram of the first embodiment of facsimile apparatus. The facsimile apparatus comprises a control portion 1, a facsimile portion, and a cordless phone portion 3. The control portion 1 comprises: an interface portion 7 for communicating with a telephone line 5; a ring signal detection portion 4 for detecting a ring signal from the telephone line 5, generating a detected ring signal, and generating a ring sound signal; a main central processing unit (CPU) 6 for receiving the detected ring signal and performing a controlling operations of the control portion and slave CPUs 13 and 18 mentioned later through control signals; a start signal detection portion 8 for detecting a facsimile communication start signal in G3 and G4 modes; a mode switch 9 for changing a communication mode between facsimile and telephone modes; a line switch 10 for connecting the telephone line 5 in OFF-HOOK condition and disconnecting the telephone line 5 in ON-HOOK condition; an operation portion 11, having a liquid crystal (LCD) display 11a for display, operation keys for a dialing operation, the facsimile operation, an internal line communication operation or the like, and an OFF-HOOK switch 11c for supplying an OFF-HOOK signal to the main CPU 6; and a dial signal generation portion 12 for supplying a dial signal to the telephone line 5 through the interface portion 7 in response to the operation keys 11b under control of the main CPU 6.

In G3 mode, the facsimile start signal is the CNG signal. However, in the G4 mode, a different signal is used for the facsimile start signal. The line switch 10 connects the telephone line 5 to the interface 7 and discloses the line from the interface portion 7 in response to the OFF-HOOK conditions of the cordless phone portion 3 and OFF-HOOK switch 11c.

The facsimile portion 2 comprises a slave CPU 13, having a normal operation mode and a non-normal operation mode, for performing a controlling operation of the facsimile portion 2 under the control of the main CPU 6, a sound signal synthesizing LSI 14 for reproducing an out-going message recorded in a digital data stored in a memory 28 and supplying a sound signal indicative of an out-going message or the like, a modem 15 for performing a modulation with an image signal to transmit the image signal to the telephone line 5 and demodulating a received image signal, a printer for printing the received and demodulated image signal to reproduce the received image, a scanner 17 for reading the image on a copy and supplying an image signal to the modem 15.

Figure 8:
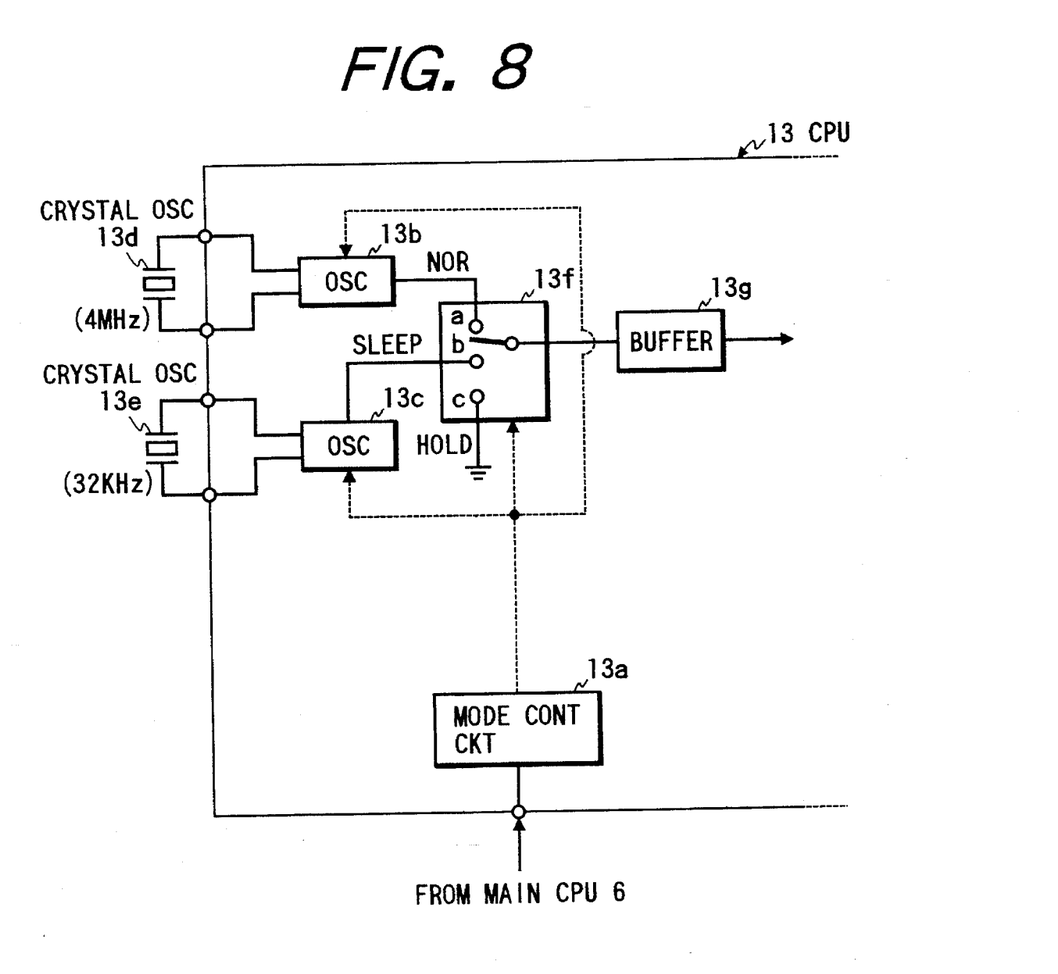
FIG. 8 is a partial block diagram of this embodiment of a clock signal generation portion included in the slave CPU shown in FIG. 1.

The slave CPU 13 performs 16-bit processing operation in response to a high frequency clock signal in the normal operation mode for effecting a compression and expansion of the image data. The main CPU 6 switches the operation mode of the slave CPU 13 between the normal and non-normal operation modes. In the non-normal operation mode, the power consumption of the slave CPU 13 is reduced and noise occurring at the normal operation mode is reduced. In the non-normal operation mode, there is a sleep mode and the hold mode which is mentioned later. The slave CPU 6 includes a clock signal generation portion for generating a high frequency clock signal used therein in the normal operation mode and generating a relative low frequency clock signal used therein in the sleep mode. FIG. 8 is a partial block diagram of this embodiment of a clock signal generation portion included in the slave CPU 6. The clock signal generation portion comprises a mode control circuit 13a for receiving a control signal indicative of the mode of the slave CPU 13 and for a switching control signal, a first crystal oscillator 13d and a first oscillation circuit 13b generate a normal clock signal having a frequency of 4 MHz, a second crystal oscillator 13e and a second oscillation circuit 13c generate a sleep mode clock signal having a frequency of 32 KHz, a switch 13f, having input terminals a, b, and c receiving the normal clock signal, the sleep mode clock signal, and a ground potential, for supplying the normal clock signal, the sleep mode clock signal, and the ground potential to the processing portion (not shown) of the slave CPU 13 through a buffer 13g. When the main CPU 6 supplies the control signal indicative of the normal mode to the mode control circuit 13a, the switch 13f supplies the normal clock signal (4 MHz) to the buffer 13g. When the main CPU 6 supplies the control signal indicative of the sleep mode to the mode control circuit 13a, the switch 13f supplies the sleep mode clock signal (32 KHz) to the buffer 13g. When the main CPU 6 supplies the control signal indicative of the hold mode to the mode control circuit 13a, the switch 13f supplies the ground potential to the buffer 13g, so that the buffer 13 does not supply the clock signal to the processing portion of the slave CPU 13. The oscillations of the oscillation circuits 13b and 13c are also controlled by the switching control signal to prevent the generation of the noise interfering mutually.

The cordless telephone portion 3 comprises a slave CPU 18 for effecting controlling operations of the cordless telephone portion 3 under control of the main CPU 6, a modem 19 for transmitting and receiving a command signal and a conditional signal in the sound signal form under the controlling of the CPU 18, an amplifier 21 for amplifying the sound signals from the cordless telephone portion 3 to the control portion 1 and from the control portion 1 to the cordless phone portion 3, a radio frequency portion 22 for transmitting a first sound signal through a radio wave signal through an antenna 23 to a cordless phone 20 and receiving a second sound signal through the radio wave signal through the antenna 23 from the cordless phone 20, a microphone 26 for receiving a sound or a message from the user, and a speaker 25 for generating a sound or message in accordance with the sound signal from the cordless phone 20 or the control portion 1, and a speaker phone circuit 24 for processing the sound signal between the cordless phone 20 or the control portion 1 to enable the communication with the user remote, or without holding a handset by the user. The microphone 26, a speaker 25, and a speaker phone circuit 24 may be replaced by a handset as a speech circuit.

In this embodiment, the slave CPU 18 is provided to the cordless telephone portion 3. However, this slave CPU 18 can be omitted and the main CPU 6 can control the telephone portion if the slave CPU 18 is omitted.

FACSIMILE AND CORDLESS PHONE RECEIVING OPERATION

Figure 2:
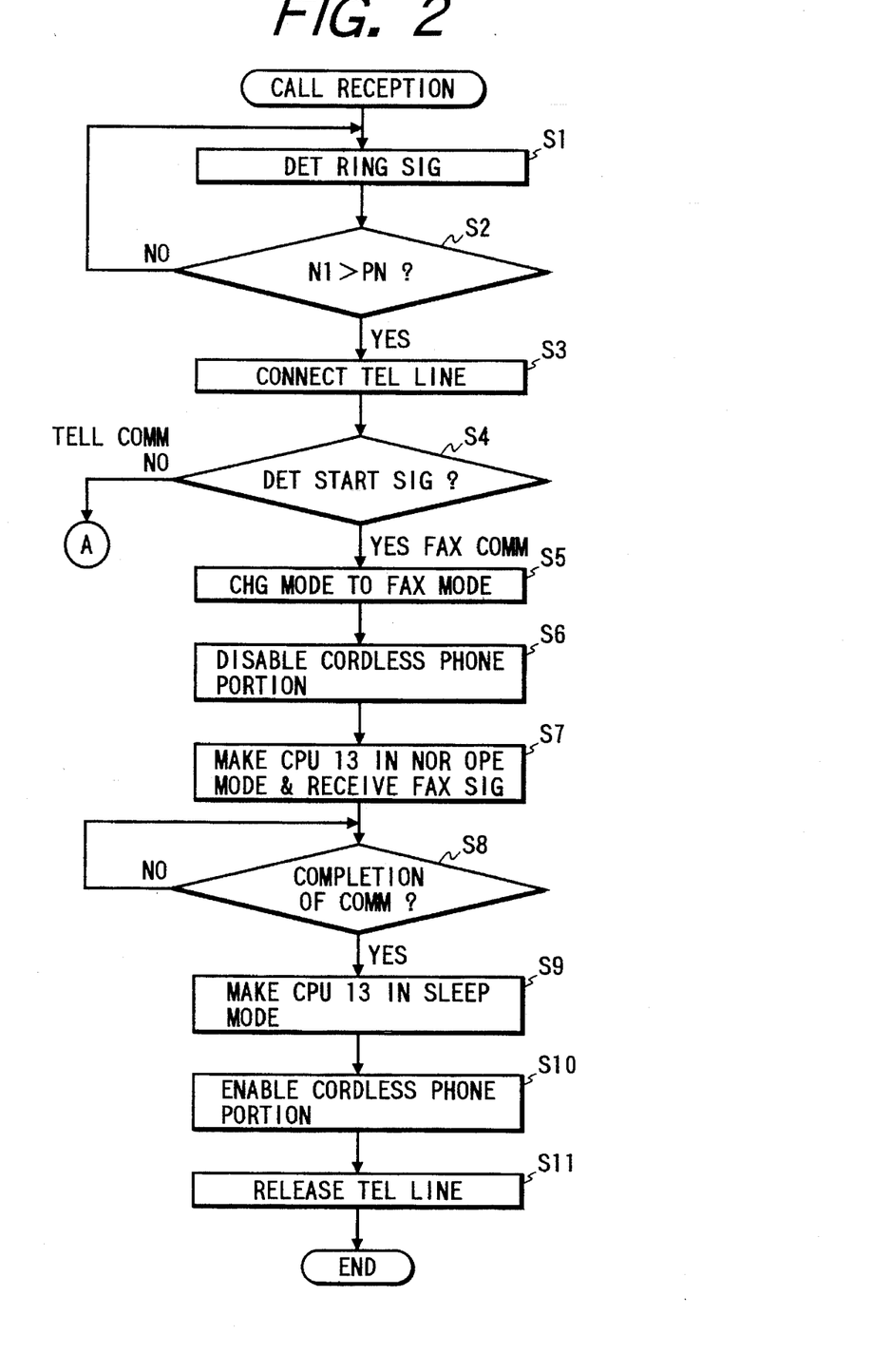
FIGS. 2 and 3 show a flow chart of this embodiment of the facsimile and cordless phone communication receiving operation of the facsimile apparatus.
Figure 3:
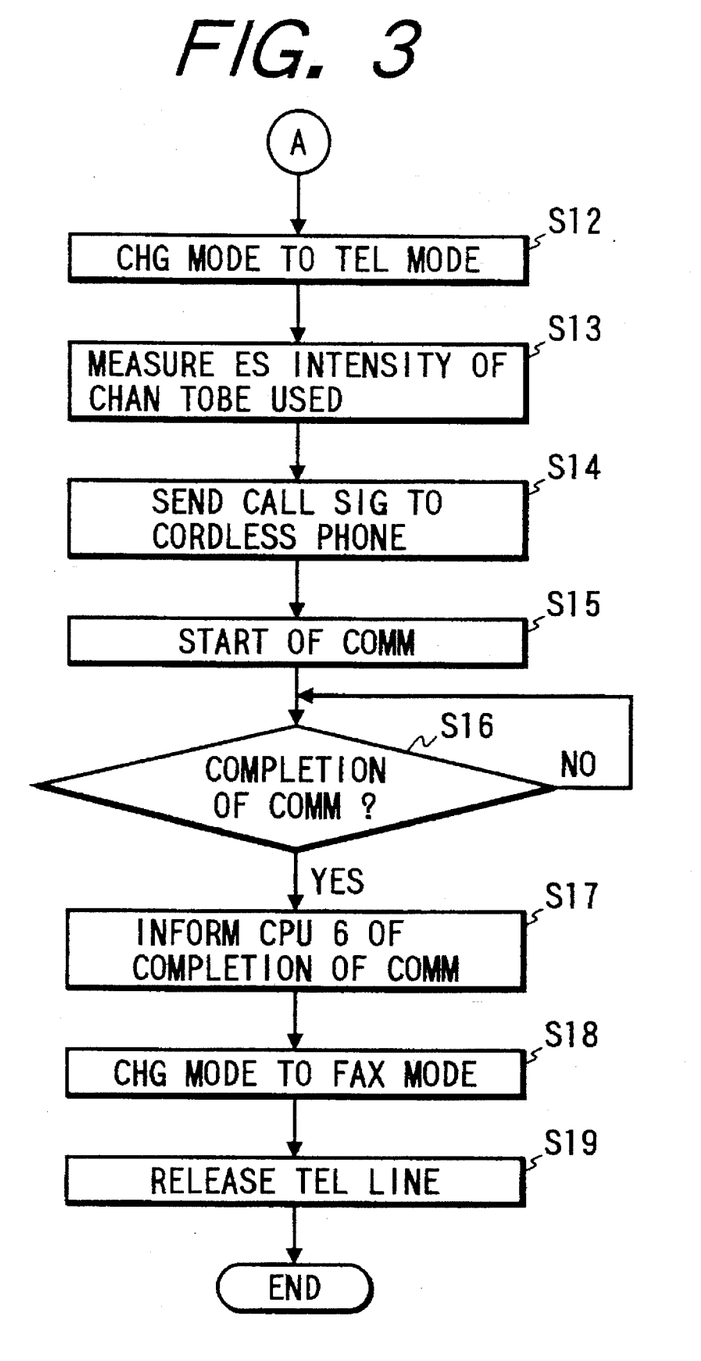

A facsimile and cordless phone communication receiving operation will be described. In this operation, the facsimile receiving operation has a priority to the cordless communication. FIGS. 2 and 3 show a flow chart of the facsimile and cordless phone communication receiving operation of the facsimile apparatus of this embodiment.

Because in this operation, the facsimile operation has the priority to the cordless phone communication, the mode switch 9 is switched to a facsimile side F to connect the sound signal pass from the interface portion 7 to the facsimile portion 2 in the initial and waiting conditions. In the facsimile portion 2, the slave CPU 13 is in the sleep mode when the facsimile portion 2 does not receive or send the image signal. Therefore, a processing speed of the slave CPU 13 is extremely decreased and an interference noise received by the radio portion 22 is reduced.

When there is a call from the telephone line 5, the ring signal detection portion 4 detects a ring signal from the telephone line 5, generates an alert sound to a user through the speaker 4a and supplies a detected ring signal to the main CPU 6 in step s1. In step s2, if the number N1 of the arrival of the ring signal exceeds a predetermined number PN, the main CPU 6 connects the telephone line 5 by controlling the line switch 10 and the interface portion 7 in step s3.

In the following step s4, processing branches off to the facsimile and telephone communications. If the start signal detection portion detects the start signal, namely, the CNG signal in G3 mode, processing proceeds to facsimile communication processing, that is, to step s5. In step s5, the main CPU 6 changes the mode to the facsimile communication mode wherein the mode switch 9 has been set to the facsimile communication mode. In the following step s6, the main CPU 6 supplies a control signal indicative of disable of the cordless phone portion 3 to the cordless phone 3.

In the following step s7, the main CPU 6 supplies a control signal indicative of changing the mode of the slave CPU 13 to the normal operation mode from the sleep mode to the slave CPU 13. Therefore, the facsimile portion 2 starts the reception of the facsimile signal in step s7. After the completion of reception of the facsimile signal, or the completion of the communication, in step s8, the slave CPU 13 informs the main CPU 6 of the completion of facsimile communication. The main CPU 6 makes the slave CPU 13 in the sleep mode in step 9 to disable the facsimile portion 2. Then, the main CPU 6 supplies a control signal indicative of enabling the operation of cordless phone portion 3 to the slave CPU 13 in step s10. The main CPU 6 releases the telephone line 5 by controlling the interface portion 7 and the line switch 10 in step s11.

From the step s6 to step s9, because the cordless phone portion 3 is disabled, when the user tries to make an internal communication, the main CPU 6 does not accept this demand.

In step s4, if the start signal detection portion 8 does not detect the start,signal, the main CPU 6 changes the mode to the telephone mode and supplies a control signal indicative of changing the connection to the telephone mode T to the mode switch 9 in step s12 to connect the sound signal passage from the interface portion to the cordless phone portion 3. The slave CPU 18 supplies a control signal to the modem 19 and the radio frequency portion 22 to measure an electrostatic intensity of the channel to be used in step s13. If the electrostatic intensity is less than a predetermined value, the slave CPU 18 judges that the channel is free. If the electrostatic intensity is not less than the predetermined value, the slave CPU 18 judges that the channel is used and search a free channel similarly. Then, the slave CPU 18 sends a call signal to the cordless phone 20 using the modem 19 and the radio frequency portion 22 in step s14. In the following step s15, the slave CPU 18 control the cordless pone portion 3, the cordless phone 20, an control portion 1 to perform the cordless communication in step s15.

During this cordless communication operation, the slave CPU 13 is in the sleep mode. Therefore, the clock signal frequency of the slave CPU 13 is decreased to 32 KHz in the sleep mode from 4 MHz in the normal operation mode. In this state, the noise generated by the facsimile portion 2 is extremely low. Therefore, the cordless phone portion 3 can measure the electrostatic intensity of a channel without affection of the noise generated by the facsimile portion 2. Moreover, the noise level is extremely low, so that the cordless communication can be performed without the noise.

The facsimile operation is not effected when the slave CPU 13 is in the sleep mode. However, because the supply power to the slave CPU 13 is not cut off, the data concerning the facsimile communication which have done up to that instant is still stored and the facsimile communication can be restarted when the cordless communication has finished.

After completion of the cordless phone communication in step s16, the slave CPU 18 informs the main CPU 6 of the completion of the cordless phone communication instep s17. The main CPU 6 supplies to a control signal indicative of connection of the sound signal passage from the interface 7 to the facsimile side F again in s18. In the following step s19, the main CPU 6 releases the telephone line 5 by controlling the interface portion 7 and the line switch 10.

FACSIMILE CALL RESPONSE OPERATION DURING EXTENSION LINE COMMUNICATION

Then, a facsimile call response operation during the extension line communication will be described.

Figure 4:
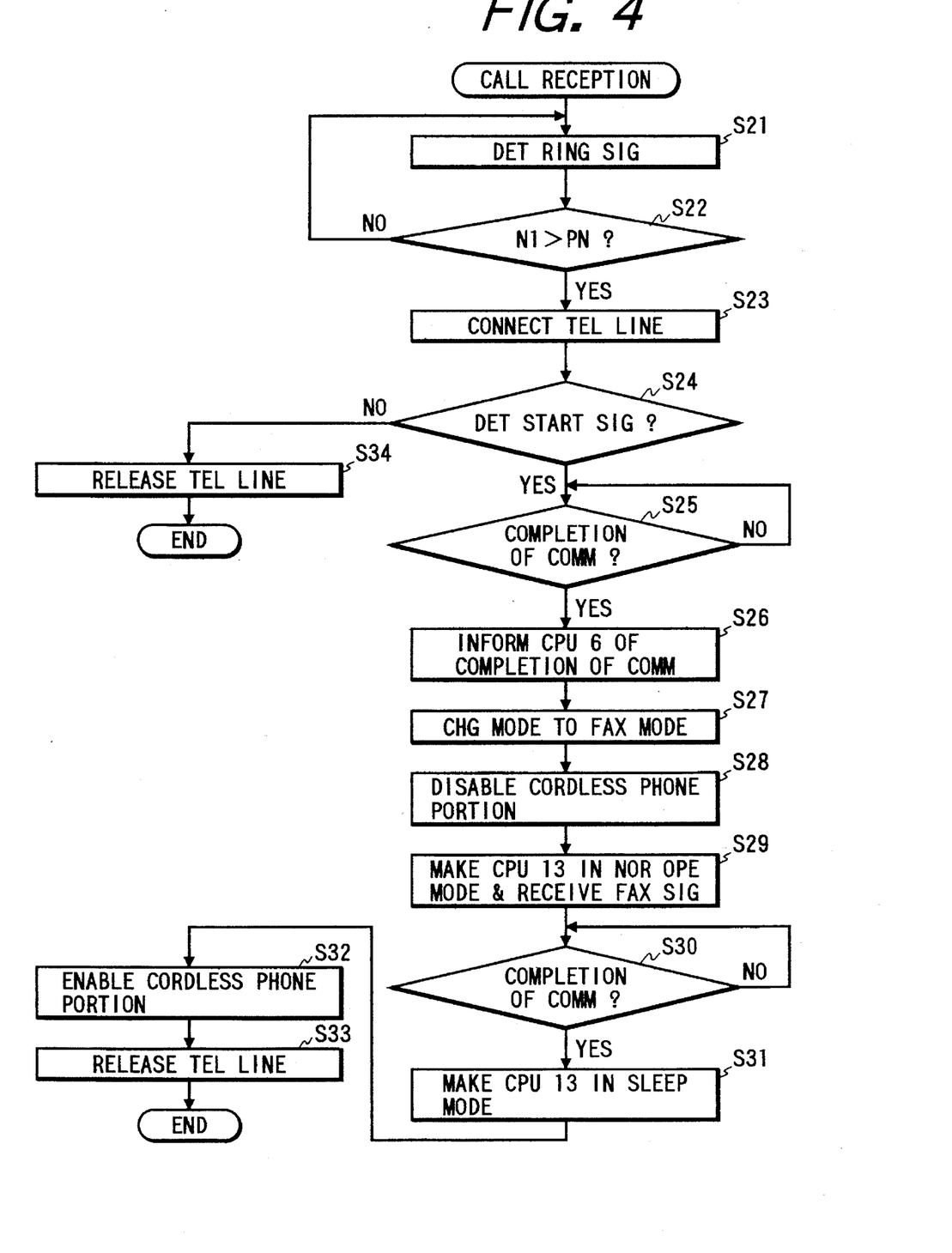
FIG. 4 shows a flow chart of this embodiment of a facsimile call response operation during the extension line communication.

FIG. 4 shows a flow chart of this embodiment of a facsimile call response operation during the extension line communication. When the slave CPU 13 is in the sleep mode and the user operates the operation portion to perform an extension line communication, the mode switch 9 is switched to the telephone side T and the extension line communication is made.

During the extension line communication, when there is a call from the telephone line and the ring signal detection portion detects the ring signal from the telephone line 5, the CPU 6 detects the detected ring signal in step s21. In step s22, if the number N1 of the arrival of the ring signal exceeds a predetermined number PN, the main CPU 6 connects the telephone line 5 by controlling the line switch 10 and the interface portion 7 in step s23.

In the following step s24, if the start signal detection portion detects a start signal, namely, the CNG signal in G3 mode, processing proceeds to facsimile communication processing, that is, to step s25. However, the main CPU 6 keeps the cordless phone communication mode after the completion of the communication and keeps the sleep mode of the slave CPU 13. In step s25, if the communication has finished, the slave CPU 18 informs the main CPU 6 of the completion of the communication in step s26. The main CPU 6 changes the mode to the facsimile communication mode from the cordless phone communication mode in step s27. In the following step s28, the main CPU 6 supplies the control signal indicative of disable of the cordless phone portion 3 to the cordless phone 3.

In the following step s29, the main CPU 6 makes the supplies the control signal indicative of changing its mode to the normal operation mode from the sleep mode to the slave CPU 13. Therefore, the facsimile portion 2 starts the reception of the facsimile signal in step s29, that is, the facsimile portion sends a response signal to the calling facsimile to start the reception of the facsimile signal. After completion of the reception of the facsimile signal, or completion of the communication, in step s30, the slave CPU 13 informs the main CPU 6 of the completion of the facsimile communication. The main CPU 6 makes the slave CPU 13 in the sleep mode in step 31 to disable the facsimile portion 2. Then, the main CPU 6 supplies the control signal indicative of enabling the operation of the cordless phone portion 3 to the slave CPU 13 in step s32. The main CPU 6 releases the telephone line 5 by controlling the interface portion 7 and the line switch 10 in step s33.

In step s24 if there is no start signal, the main CPU 6 release the telephone line 5.

FACSIMILE TRANSMISSION OPERATION

Figure 5:
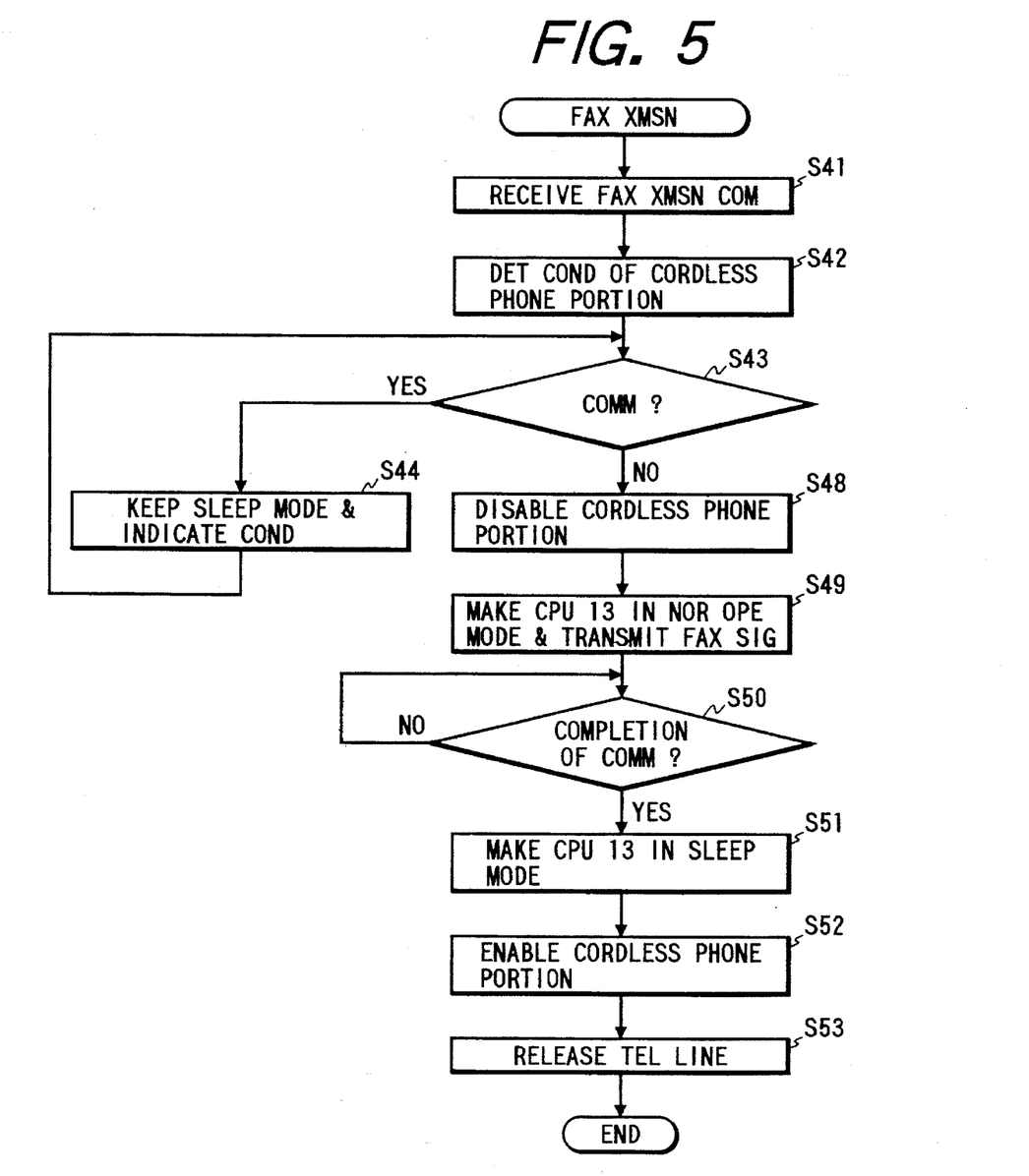
FIG. 5 shows a flow chart of this embodiment of the facsimile transmission operation.

A facsimile transmission operation will be described. FIG. 5 shows a flow chart of this embodiment of the facsimile transmission operation. This operation starts in response to a facsimile transmission command from the user by operating the operation portion 11. In step s41, the main CPU 6 receives the facsimile transmission command from the operation portion 11. In the following step s42, the main CPU 6 detects the condition of the cordless phone portion in step s42 by communicating with the slave CPU 18. If the cordless phone portion 3 is in the communication condition, processing proceeds to step s44. In step 44, the main CPU 6 keeps the slave CPU 13 in the sleep mode and makes an indication on the LCD 11a to inform the user of that the cordless phone 20 is currently used until the communication has finished. If the cordless phone portion 3 is not in the communication condition, processing proceeds to step s48. In step 48, the main CPU 6 supplies the control signal indicative of disable of the cordless phone portion 3 to the cordless phone 3.

In the following step s49, the main CPU 6 supplies the control signal indicative of changing its mode to the normal operation mode from the sleep mode to the slave CPU 13. Then, the facsimile portion 2 starts the transmission of the facsimile signal in step s49, that is, the main CPU 6 supplies the dial signal using the dial signal generation portion 12 and the CNG signal using the facsimile portion 2 and the facsimile portion 2 transmits the facsimile signal. After completion of the transmission of the facsimile signal, or completion of the facsimile communication, in step s50, the slave CPU 13 informs the main CPU 6 of the completion of the facsimile communication. The main CPU 6 makes the slave CPU 13 in the sleep mode in step 51 to disable the facsimile portion 2. Then, the main CPU 6 supplies the control signal indicative of enabling the operation of the cordless phone portion 3 to the slave CPU 13 in step s52. The main CPU 6 releases the telephone line 5 by controlling the interface portion 7 and the line switch 10 in step s53.

In this operation, if the user cancels the facsimile transmission during the extension line communication or a predetermined interval has passed during the extension line communication, the facsimile transmission is cancelled.

FACSIMILE TRANSMISSION INTERRUPTION OPERATION

Figure 6:
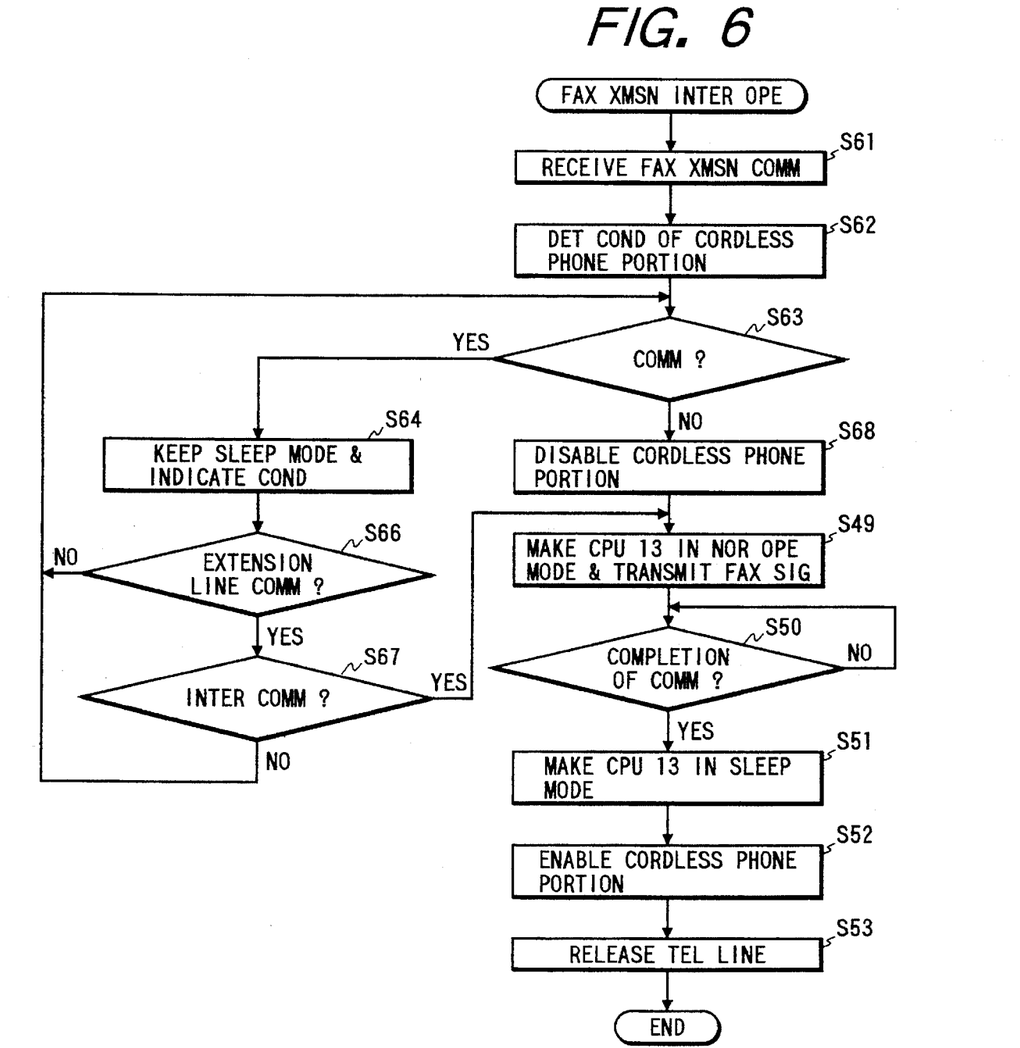
FIG. 6 shows a flow chart of this embodiment of the facsimile interruption transmission operation.

A facsimile interruption transmission operation will be described. FIG. 6 shows a flow chart of this embodiment of the facsimile interruption transmission operation. This operation starts in response to a facsimile transmission command from the user by operating the operation portion 11 during the extension line communication. In step s61, the main CPU 6 receives the facsimile transmission command from the operation portion 11. In the following step s62, the main CPU 6 detects the condition of the cordless phone portion s62 by communicating with the slave CPU 18. If the cordless phone portion 3 is in the communication condition, processing proceeds to step s64. In step 64, the main CPU 6 keeps the slave CPU 18 in the sleep mode and makes an indication on the LCD 11a to inform the user of that the cordless phone 20 is currently used until the communication has finished. In the following step s66, the main CPU 6 makes a decision as to whether or not the communication is an extension line communication. If the answer is NO processing returns to step s68. If the answer is YES, processing proceeds to step s67. In step 67, the main CPU detects an interruption command from the operation portion generated by operating one of operation keys 11b by the user. If the answer is NO, processing proceeds to step s63.

In step s63, if the cordless phone portion 3 is not in the communication condition, processing proceeds to step s68. In step s68, the main CPU 6 supplies the control signal indicative of disable of the cordless phone portion to the cordless phone 3.

In the following step s49, the main CPU 6 supplies the control signal indicative of changing its mode to the normal operation mode from the sleep mode to the slave CPU 13. Then, the facsimile portion 2 starts the transmission of the facsimile signal in step s49, that is, the main CPU 6 supplies the dial signal using the dial signal generation portion 12 and the CNG signal using the facsimile portion and the facsimile portion 2 transmits the facsimile signal. After completion of the transmission of the facsimile signal, or completion of the facsimile communication, in step s50, the slave CPU 13 informs the main CPU 6 of the completion of the facsimile communication. The main CPU 6 makes the slave CPU 13 in the sleep mode in step 51 to disable the facsimile portion 2. Then, the main CPU 6 supplies the control signal indicative of enabling the operation of the cordless phone portion 3 to the slave CPU 13 in step s52. The main CPU 6 releases the telephone line 5 by controlling the interface portion 7 and the line switch 10 in step s53.

In step s67, if the interruption command is detected, namely, the answer is YES, processing proceeds to step s49 to force the execution of the facsimile transmission by the operation from steps s49 to s53. In this facsimile transmission interruption operation by processing from steps s49 to s53, the slave CPU 13 generates a noise interfering the extension line communication to some extent. However, in this state, because the cordless communication link between the cordless phone 20 and the cordless phone portion 3 has established, the controlling operation in the extension line communication is not largely affected.

If there is no interruption commend, the facsimile transmission operation is executed after the completion of the extension line communication.

In this operation, if the user cancels the facsimile transmission during the extension line communication or a predetermined interval has passed due to the extension line communication, the facsimile transmission is cancelled.

OPERATION IN RESPONSE TO TELEPHONE CALL BY CORDLESS PHONE

Figure 7:
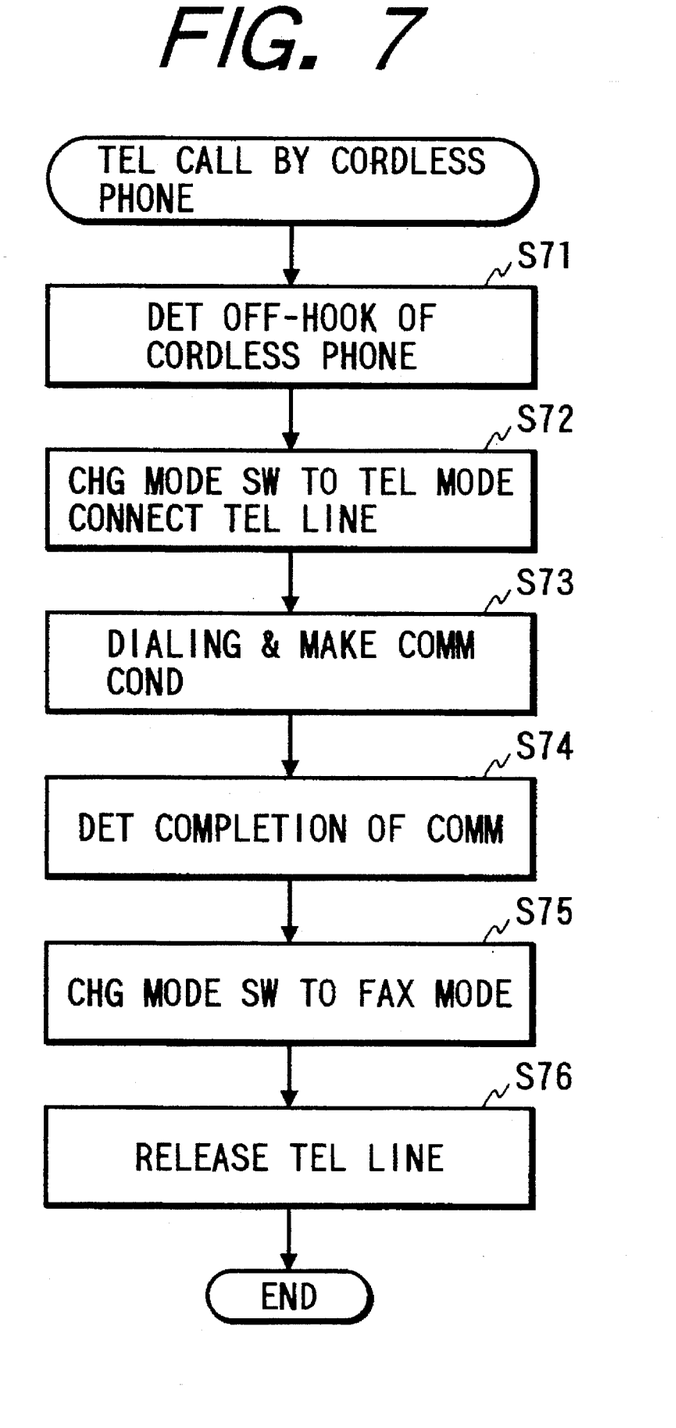
FIG. 7 shows a flow chart of this embodiment of a telephone call response operation by the cordless phone unit.

FIG. 7 shows a flow chart of this embodiment showing an operation in response to a telephone call by the cordless phone 20. In step s71, the main CPU 6 detects the OFF-HOOK of the cordless phone 20 via the radio frequency portion 22, the modem 19, and the slave CPU 18. Then, the main CPU 6 operates the mode switch to connect the sound passage from the interface portion 7 to the telephone side T and connects the telephone line 5 by controlling the interface portion 7 and the line switch 10 in step s72. In the following step s73, the main CPU 6 supplies a dial signal using the dial signal generation potion 12 to the telephone line 5 and makes the communication condition in step s73.

During this cordless communication operation, the slave CPU 13 is in the sleep mode. Therefore, the clock signal circuit included in the slave CPU 13 makes the frequency of the clock signal used for processing the slave CPU 13 is decreased to 32 KHz in the sleep mode from 4 MHz in the normal operation mode. In this state, the noise generated by the facsimile portion 2 is extremely low. Therefore, the cordless phone portion 3 can measure the electrostatic intensity of a channel without affection of the noise generated by the facsimile portion. Moreover, the noise level is extremely low, so that the cordless communication can be performed without the noise.

The facsimile operation is not effected when the slave CPU 13 is in the sleep mode. However, because the supply power to the slave CPU 13 is not cut off, the data concerning the facsimile communication which have done up to the instant is still stored and the facsimile communication can be restarted when the cordless communication has finished.

In the following step s74, the main CPU 6 detects the completion of the communication, i.e., the main CPU 6 detects the ON-HOOK of the cordless phone 20 via the radio frequency portion 22, and the slave CPU 18. When the communication has finished, the main CPU 6 changes the mode switch 9 to the facsimile mode in step s75. In the following step s76 the main CPU 6 releases the telephone line 5 by controlling the interface portion 7 and the line switch 10.

In the above-mentioned description, the sleep mode is used as the non-normal operation of the slave CPU 13. However, the hold mode of the slave CPU 13 also provides the same noise reduction effect as the sleep mode.

In the hold mode, there are first and second types of hold mode. In the first type of hold mode, the frequency of the clock signal is the same as the normal operation but the processing in the CPU is essentially stopped. In the second type of hold mode, the generation of clock signal used for processings of the CPU 13 is stopped. This type is shown in FIG. 8.

After the sleep mode and the hold mode, the slave CPU 13 restarts the processing in response to a control signal indicative of the normal operation. In the hold mode, the facsimile portion generates an extremely low level of the interference noise, so that the telephone communication through the radio wave signal between the cordless phone 20 and the radio frequency portion 22 is not interfered.

In the above mentioned embodiment, the frequency of the clock signal used for the processing of the slave CPU 13 is reduced by the clock signal circuit included in the slave CPU 13. However, it is also possible that another clock signal circuit is provided outside the slave CPU 13 and the frequency of the clock signal supplied to the slave CPU 13 is reduced from the normal frequency of the clock signal to the reduced frequency in the sleep mode. The reduced frequency is determined in consideration of the interference noise level received by the radio frequency portion 22.

What is claimed is:

1. A facsimile apparatus comprising:

a ring signal detection portion for detecting a ring signal from a telephone line;

an interface portion for coupling said interface portion to said telephone line;

a facsimile communication start signal detection portion responsive to said interface portion for detection a facsimile communication start signal;

a facsimile portion, having a central processing unit having first and second modes, for effecting facsimile receiving and transmitting operations through said interface portion;

a cordless phone portion for communicating with a cordless phone unit and forming a communication passage between said cordless phone unit and said telephone line through said interface portion through a radio wave signal, said central processing unit executing said receiving and transmitting operations and generating an interference noise received by said cordless phone portion in the first mode and reducing a processing speed of said facsimile receiving and transmitting operations to reduce the generation of said interference noise received by said cordless phone portion in said second mode; and a control portion for making said central processing unit to operate in said first mode and operating said facsimile portion when said facsimile portion is to be operated, for making said central processing unit to operate in said second mode when said facsimile portion is not operated, and for operating said cordless phone portion in response to said detected ring signal, an OFF-HOOK signal sent from said cordless unit to said cordless phone portion.

2. A facsimile apparatus as claimed in claim 1, wherein said control portion further comprises communication completion detection means for detecting a completion of the communication between said cordless phone portion and said cordless phone unit, said control portion keeps said central processing unit in said second mode when said ring signal and said facsimile communication start signal are detected while said control portion operates said cordless phone portion, and said control portion operates said facsimile portion to effect a facsimile receiving operation after the communication completion detection means detects said completion of the communication.

3. A facsimile apparatus as claimed in claim 1, wherein said control portion makes said central processing unit to operate in said first mode and operates said facsimile portion to effect a facsimile transmission operation in response to a facsimile transmission command while said cordless phone portion is in an extension line mode.

4. A facsimile apparatus as claimed in claim 1, wherein said control portion keeps said central processing unit in said second mode in response to a first facsimile transmission command while said cordless phone portion is in said extension line mode and said control portion makes said central processing unit to operate in said first mode and operates said facsimile portion to effect said facsimile transmission operation in response to said first facsimile transmission command and a second facsimile transmission command while said cordless phone portion is in an extension line mode.

5. A facsimile apparatus as claimed in claim 1, wherein said central processing unit has first and second processing speeds in said first and second modes respectively, said second processing speed is extremely lower than said first processing speed.

6. A facsimile apparatus as claimed in claim 1, wherein said second mode is a sleep mode.

7. A facsimile apparatus as claimed in claim 5, wherein said second processing speed is or approximately zero.

8. A facsimile apparatus as claimed in claim 1, wherein said second mode is a hold mode.

9. A facsimile apparatus comprising:

a ring signal detection portion for detecting a ring signal from a telephone line;

an interface portion for coupling said interface portion to said telephone line;

a facsimile communication start signal detection portion responsive to said interface portion for detection a facsimile communication start signal;

a facsimile portion, having a central processing unit having first and second modes, for effecting facsimile receiving and transmitting operations through said interface portion;

a cordless phone portion, having a speech circuit for communicating with a cordless phone unit forming a first communication passage between said cordless phone unit and said telephone line through said interface portion through a radio wave signal in a non-extension line mode and forming a second communication passage between said cordless phone unit and said speech circuit through said radio wave signal in an extension line mode, said central processing unit executing said receiving and transmitting operations and generating an interference noise received by said cordless phone portion in the first mode and reducing the processing speed of said receiving and transmitting operations to reduce the generation of said interference noise received by said cordless phone portion in said second mode; and a control portion for making said central processing unit in said first mode and operating said facsimile portion when said facsimile portion is to be operated, for making said central processing unit in said second mode when said facsimile portion is not operated, and for operating said cordless phone portion in response to said detected ring signal, a first OFF-HOOK signal supplied thereto, and a second OFF-HOOK signal sent from said cordless unit to said cordless phone portion.

10. A facsimile apparatus as claimed in claim 9, wherein said control portion further comprises communication completion detection means for detecting a completion of the communication between said cordless phone portion and said cordless phone unit, said control portion keeps said central processing unit in said second mode when said ring signal and said facsimile communication start signal are detected while said control portion operates said cordless phone portion, and said control portion operates said facsimile portion to effect said receiving operation after the communication completion detection means detects said completion of the communication.

11. A facsimile apparatus as claimed in claim 9, wherein said control portion makes said central processing unit to operate in said first mode and operates said facsimile portion to effect a facsimile transmission operation in response to a facsimile transmission command while said cordless phone portion is in an extension line mode.

12. A facsimile apparatus as claimed in claim 9, wherein said control portion keeps said central processing unit in said second mode in response to a first facsimile transmission command while said cordless phone portion is in said extension line mode and said control portion makes said central processing unit in said first mode and operates said facsimile portion to effect a facsimile transmission operation in response to said first facsimile transmission command and a second facsimile transmission command while said cordless phone portion is in said extension line mode.

13. A facsimile apparatus as claimed in claim 9, wherein said central processing unit has first and second processing speeds in said first and second modes respectively and said second processing speed is extremely lower than said first processing speed.

14. A facsimile apparatus as claimed in claim 9, wherein said second mode is a sleep mode.

15. A facsimile apparatus as claimed in claim 13, wherein said second processing speed is or approximately zero.

16. A facsimile apparatus as claimed in claim 9, wherein said second mode is a hold mode.

17. A facsimile apparatus as claimed in claim 1, wherein said facsimile portion is to be operated when said ring signal and said facsimile communication start signal is detected.

18. A facsimile apparatus as claimed in claim 1, wherein said facsimile portion is to be operated when a facsimile operation command from the user is present.

19. A facsimile apparatus as claimed in claim 9, wherein said facsimile portion is to be operated when said ring signal and said facsimile communication start signal is detected.

20. A facsimile apparatus as claimed in claim 9, wherein said facsimile portion is to be operated when a facsimile operation command from the user is present.

* * * * *

UNITED STATES PATENT AND TRADEMARK OFFICE
CERTIFICATE OF CORRECTION

PATENT NO. : 5,517,552
DATED : May 14, 1996
INVENTOR(S) : Tetsuo Yamashita

It is certified that error appears in the above-indentified patent and that said Letters Patent is hereby corrected as shown below:

On the title page: Item [63] Patent Priority: should read
-- JP 6-74798 filed April 13, 1994 --.

Signed and Sealed this

Twenty-fifth Day of February, 1997

Attest:

BRUCE LEHMAN

*Attesting Officer*     *Commissioner of Patents and Trademarks*